US012759694B2

(12) United States Patent
Di Leo et al.

(10) Patent No.: US 12,759,694 B2
(45) Date of Patent: Oct. 13, 2026

(54) METHODS AND APPARATUS TO CONTROL PROPELLER PITCH IN DUAL ACTING PROPELLERS

(71) Applicant: GE AVIO S.R.L, Rivalta di Torino (IT)

(72) Inventors: Diego Di Leo, Bari (IT); Giuseppe Cervelli, Bari (IT); Paolo Altamura, Brindisi (IT)

(73) Assignee: GE Avio S.r.l., Rivalta di Torino (IT)

( * ) Notice: Subject to any disclaimer, the term of this patent is extended or adjusted under 35 U.S.C. 154(b) by 130 days.

(21) Appl. No.: 18/525,315

(22) Filed: Nov. 30, 2023

(65) Prior Publication Data

US 2024/0359793 A1 Oct. 31, 2024

(30) Foreign Application Priority Data

Apr. 28, 2023 (IT) ........................ 102023000008460

(51) Int. Cl.
*B64C 11/38* (2006.01)

(52) U.S. Cl.
CPC .................................. *B64C 11/385* (2013.01)

(58) Field of Classification Search
CPC .......... F01D 7/00; F01D 7/02; F05D 2260/79; F05D 2260/74; F05D 2260/75; F05D 2260/76; F05D 2260/64; F05D 2260/56; B64C 11/38; B64C 11/385; B64C 11/40; B64C 11/42; B63H 3/082; B63H 3/084; B63H 2003/088; F03D 7/0224; F03D 1/0664; F03D 1/0669; F05B 2270/604; F05B 2270/506; F05B 2260/74; F05B 2260/75; F05B 2260/76; F05B 2260/79; F15B 2013/0412; F15B 2211/31576; F15B 2211/40592; F15B 2211/41536; F15B 2211/75
See application file for complete search history.

(56) References Cited

U.S. PATENT DOCUMENTS

| | | | |
|---|---|---|---|
| 2,602,517 | A | 7/1952 | Schroeder et al. |
| 2,995,190 | A | 8/1961 | Chilman |
| 3,090,445 | A | 5/1963 | Fischer |

(Continued)

FOREIGN PATENT DOCUMENTS

| | | |
|---|---|---|
| CN | 111268097 | 6/2020 |
| GB | 818611 A | 8/1959 |

*Primary Examiner* — Courtney D Heinle
(74) *Attorney, Agent, or Firm* — Hanley, Flight & Zimmerman, LLC

(57) ABSTRACT

Methods, apparatus, systems, and articles of manufacture are disclosed to control propeller pitch in dual acting propellers. An example propeller control system comprising: a piston including a piston rod; a first valve connected to the piston rod via a first piston line and a second piston line, wherein the first valve selectively allows, based on an input signal, hydraulic fluid to transfer to the piston via the first piston line and the second piston line, wherein the first valve is a three-state valve; and an independent valve connected to the piston rod via a third piston line, wherein the independent valve selectively allows, based on an input signal, hydraulic fluid to transfer to the piston via the third piston line and wherein the independent valve operates independently of the first valve.

16 Claims, 12 Drawing Sheets

(56) References Cited

U.S. PATENT DOCUMENTS

| | | | | |
|---|---|---|---|---|
| 3,115,937 | A * | 12/1963 | Biermann | B64C 11/385 416/46 |
| 5,186,608 | A * | 2/1993 | Bagge | B64C 11/38 416/37 |
| 6,077,040 | A * | 6/2000 | Pruden | B64C 11/38 416/157 R |
| 10,501,169 | B2 | 12/2019 | Waddleton | |
| 10,793,256 | B2 | 10/2020 | Waddleton | |
| 10,899,433 | B2 | 1/2021 | Chahal et al. | |
| 11,066,150 | B2 | 7/2021 | Futa, Jr. et al. | |
| 11,519,346 | B2 | 12/2022 | Cervelli et al. | |
| 11,530,027 | B2 | 12/2022 | Krzywon | |
| 2011/0274546 | A1* | 11/2011 | Swift | B64C 11/385 416/157 R |
| 2017/0267329 | A1* | 9/2017 | Lassalle | F01D 7/00 |
| 2019/0271333 | A1* | 9/2019 | Kondo | E02F 9/2235 |
| 2020/0189721 | A1 | 6/2020 | Maver et al. | |
| 2021/0079855 | A1* | 3/2021 | Cervelli | B64C 11/385 |
| 2023/0106850 | A1 | 4/2023 | Cervelli et al. | |

* cited by examiner

METHODS AND APPARATUS TO CONTROL PROPELLER PITCH IN DUAL ACTING PROPELLERS

CROSS-REFERENCE TO RELATED APPLICATION

This patent claims benefit to Italian Patent Application No. 102023000008460, which was filed on Apr. 28, 2023, and which is hereby incorporated herein by reference in its entirety. Priority to Italian Patent Application No. 102023000008460 filed with the Ministry of Enterprises and Made in Italy on Apr. 28, 2023, is hereby claimed.

FIELD OF THE DISCLOSURE

This disclosure relates generally to propeller control units and, more particularly, to controlling propeller pitch in dual acting propellers.

BACKGROUND

In dual acting propeller aircraft, variable pitch propeller assemblies are operatively configured to adjust propeller blades. Typically, to adjust propeller blade angle, propeller pitch of propeller blades, or a combination of both propeller assemblies include a propeller control unit. Some propeller control units can include a pitch control valve or governor. Based on one or more input signals, the pitch control valve selectively allows an amount of hydraulic fluid to flow to or drain from a pitch actuation assembly positioned within the propeller assembly. The blade angle of the propeller blades can be set to the desired pitch by adjusting the amount of hydraulic fluid in the pitch actuation assembly. Certain variable pitch propeller assemblies include ground beta or reverse mode functionality. For instance, some propeller assemblies include a ground beta enable solenoid and a ground beta enable valve that effectively enable the propeller blades to move from a feather position to a reverse pitch position (e.g., for taxiing on the ground, a reverse angle, for reverse and braking, etc.). These conventional solenoids and valves can increase the weight of the engine.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
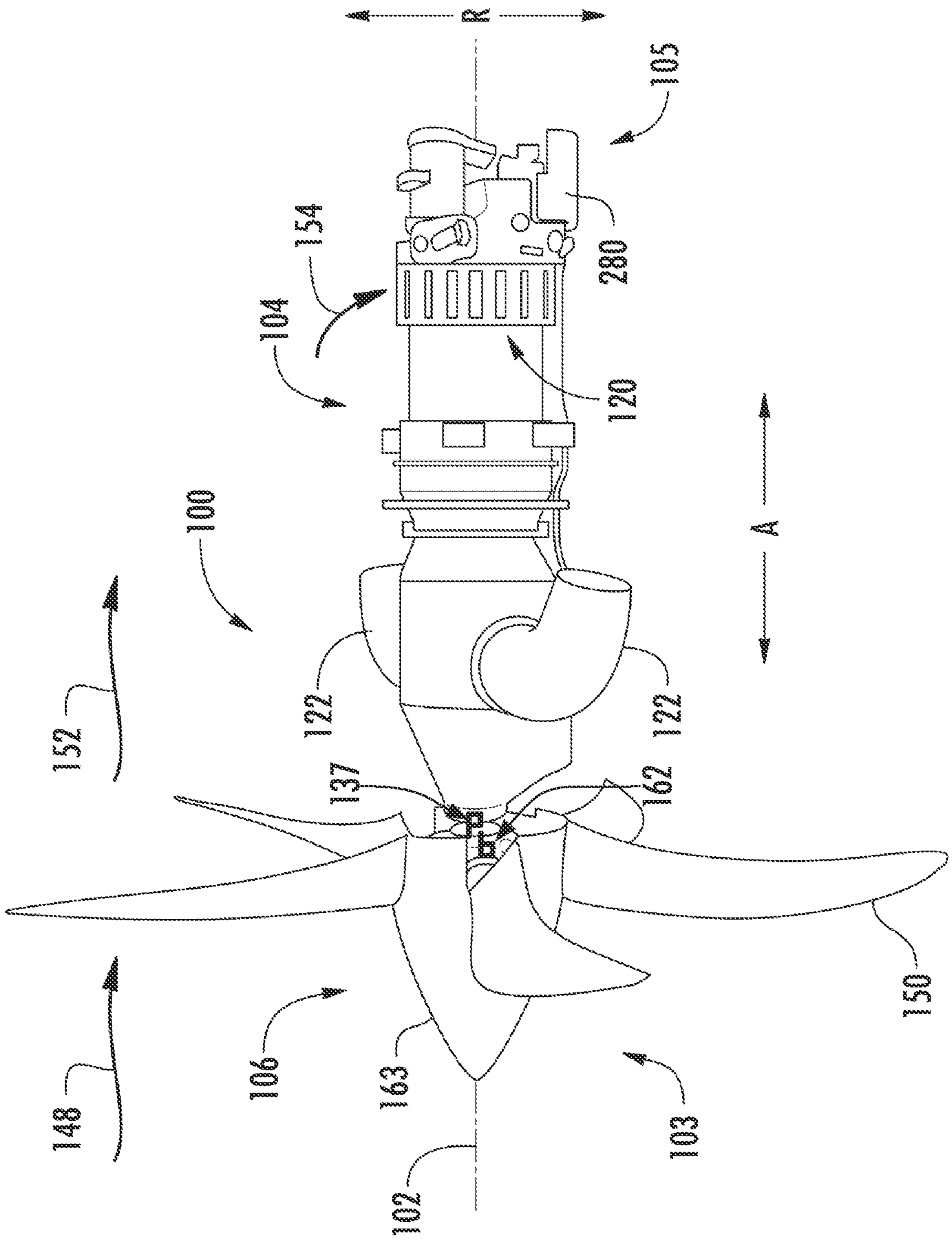
FIG. 1 is a side view of an example gas turbine engine according to an example of the present disclosure as described herein.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows.

In a dual acting propeller application, the variable pitch propeller assembly includes a plurality of propeller blades rotatable about the axial direction and spaced apart along the circumferential direction. Each propeller blade is rotatable through a plurality of blade angles about respective pitch axes each extending in the radial direction. The variable pitch propeller assembly includes a pitch actuation assembly for adjusting the plurality of propeller blades through the plurality of blade angles and includes a propeller dome defining a chamber, and a propeller control unit (PCU). Typically, the PCU supplies hydraulic fluid to a coarse chamber of a piston to push a cylinder actuator towards a feather position (e.g., a coarse direction). As used herein, the coarse chamber is a cavity located on a first side of the piston in which hydraulic fluid may be supplied or removed to move the piston along an axial direction, which, consequently, moves the propeller blades towards a feather position. As used herein, a fine chamber is a cavity located on a second side of the piston in which hydraulic fluid may be supplied or returned to move the piston along the axial direction, which, consequently, moves the propeller blades towards a reverse position. The feather position, as used herein, is a position at which the propeller blades are approximately parallel to the on-coming airflow. In other words, the propeller blades position with maximum possible pitch angle. As used herein, the coarse direction is the pitch angle increasing. The reverse position, as used herein, is a position at which the propeller blades are approximately perpendicular to the ground level. In other words, the propeller blades position with the minimum possible pitch angle. As used herein, the fine direction is the pitch angle decreasing. The coarse chamber and the fine chamber are separated by a seal. However, a failure of the seal (referred to herein as an actuator seal failure condition) can allow hydraulic fluid to flow from a fine chamber to the coarse chamber within the piston.

Failure of the actuator seal that connects the fine chamber to the coarse chamber within a piston can lead to hazardous events, such as uncontrolled pitch fining. As used herein, pitch fining indicates that the propeller blades are in a vertical position with respect to ground level, which is ideal for take-off and taxiing but not for mid-flight. In some circumstances, uncontrolled pitch fining means feather functionality is ineffective because hydraulic fluid is leaking through the actuator seal from the coarse chamber into the fine chamber. Feathering, as used herein, is the blade pitch angle increasing to the point that the chord line of the blade is approximately parallel to the on-coming airflow. Prior configurations which attempt to enable feathering of the blade even during seal failure conditions include use of counterweights or springs to push the propellers towards a feather position. In prior configurations, the springs are located within a chamber of the propeller dome. In other prior configurations, the counterweights may be located on each blade of the propeller or on the propeller dome. Examples disclosed herein guarantee feather functionality despite the seal failure in counterweight-less applications. Unfortunately, counterweights and springs add extra weight to the aircraft and increase fuel consumption, which reduces efficiency. Examples disclosed herein include an improved PCU with a capability to block hydraulic fluid flow from/to the fine chamber and pressurize the coarse chamber simultaneously. Examples disclosed herein are used in a counterweight-less application, meaning the examples are embedded in a lightweight, compact PCU design, which has a decreased number of internal components and electrical interfaces than prior configurations. Having less internal components increases the mean-time between failure. For example, an additional valve is incorporated in the improved PCU design to control hydraulic fluid flow which reduces pressure drops. Examples disclosed herein provide an improved engine configuration which minimizes or otherwise reduces weight, removes electrical interfaces, and improves associated control logic algorithms.

Figure 2:
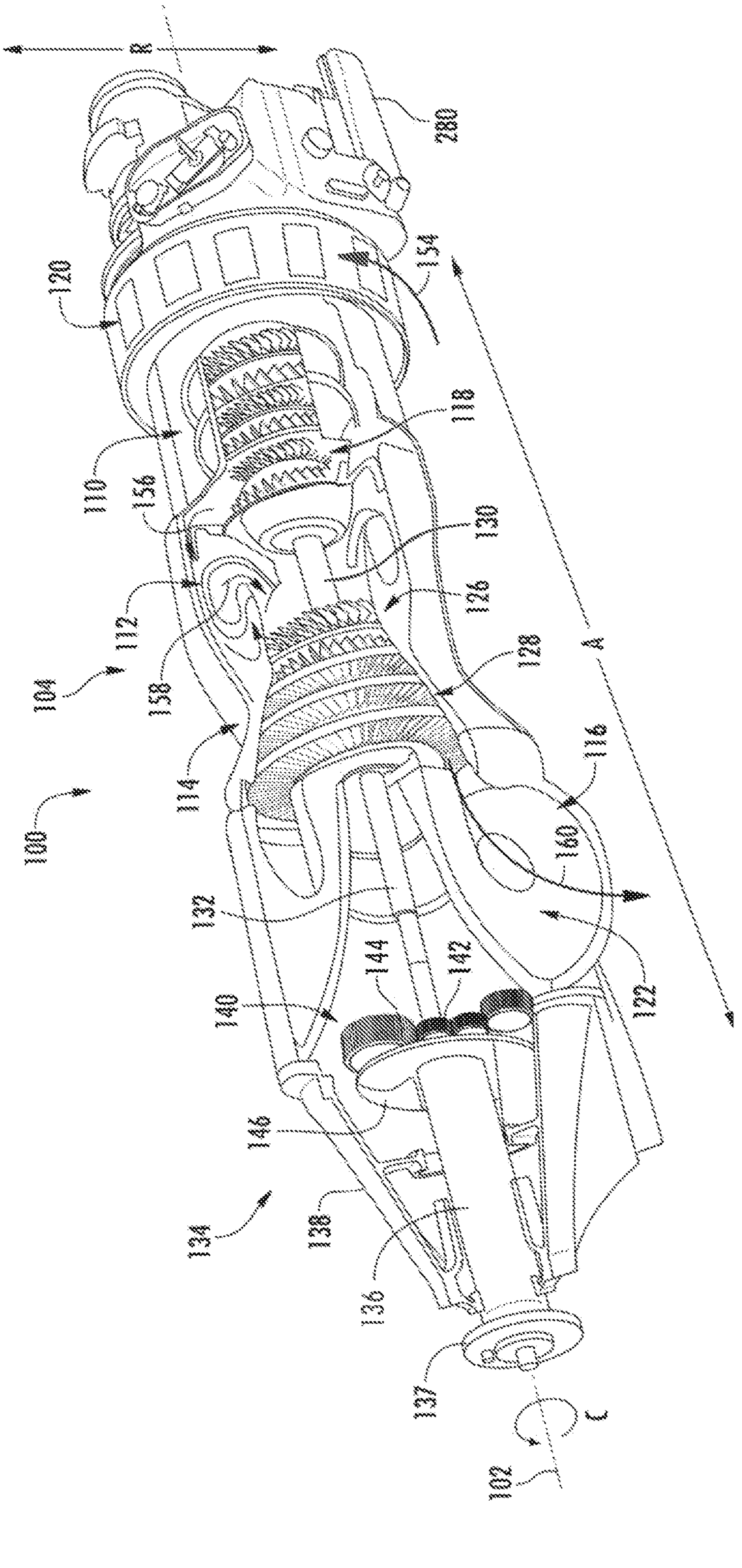
FIG. 2 is a perspective, cutaway view of the gas turbine engine of FIG. 1.

FIGS. 1 and 2 provide various views of an example gas turbine engine 100 in which one or more examples shown and described herein can be implemented. Particularly, FIG. 1 provides a side view of the gas turbine engine 100, and FIG. 2 provides a perspective, cutaway view of the gas turbine engine 100 of FIG. 1. As shown in FIG. 1, the gas turbine engine 100 is, more specifically, a turboprop engine. The gas turbine engine 100 defines an axial direction A, a radial direction R, and a circumferential direction C (FIG. 2) extending three hundred sixty degrees (360°) around the axial direction A. The gas turbine engine 100 also defines a longitudinal or axial centerline 102 extending along the axial direction A. The gas turbine engine 100 extends generally along the axial direction A between a first end 103 and a second end 105, which is the forward and aft end, respectively. Generally, the gas turbine engine 100 includes a gas generator or core turbine engine 104 and a propeller assembly 106 rotatable about the axial centerline 102, or more generally, the axial direction A.

As shown in FIG. 2, the core turbine engine 104 generally includes, in serial flow arrangement, a compressor section 110, a combustion section 112, a turbine section 114, and an exhaust section 116. A core air flow path 118 extends from an annular inlet 120 to one or more exhaust outlets 122 of the exhaust section 116 such that the compressor section 110, combustion section 112, turbine section 114, and exhaust section 116 are in fluid communication.

The compressor section 110 can include one or more compressors, such as a high pressure compressor (HPC) and a low pressure compressor (LPC). For this example, the compressor section 110 includes a four-stage axial, single centrifugal compressor. In particular, the compressor includes sequential stages of compressor stator vanes and rotor blades (not labeled), as well as an impeller (not labeled) positioned downstream of the axial stages of stator vanes and rotor blades. The combustion section 112 includes a reverse-flow combustor (not labeled) and one or more fuel nozzles (not shown). The turbine section 114 can define one or more turbines, such as a high pressure turbine (HPT) and a low pressure turbine (LPT). For this example, the turbine section 114 includes a two-stage HPT 126 for driving the compressor of the compressor section 110. The HPT 126 includes two sequential stages of stator vanes and turbine blades (not labeled). The turbine section 114 also includes a three-stage free or power turbine 128 that drives a propeller gearbox 134, which in turn drives the propeller assembly 106 (FIG. 1). The exhaust section 116 includes one or more exhaust outlets 122 for routing the combustion products to the ambient air.

Referring still to FIG. 2, the core turbine engine 104 can include one or more shafts. In this example, the gas turbine engine 100 includes a compressor shaft 130 and a free or power shaft 132. The compressor shaft 130 drivingly couples the turbine section 114 with the compressor section 110 to drive the rotational components of the compressor. The power shaft 132 drivingly couples the power turbine 128 to drive a gear train 140 of the propeller gearbox 134, which in turn operatively supplies power and torque to the propeller assembly 106 (FIG. 1) via a torque output or propeller shaft 136 at a reduced RPM. The forward end of the propeller shaft 136 includes a flange 137 that provides a mounting interface for the propeller assembly 106 to be attached to the core turbine engine 104.

The propeller gearbox 134 is enclosed within a gearbox housing 138. For this example, the gearbox housing 138 encloses the gear train 140 that includes a star gear 142 and a plurality of planet gears 144 disposed about the star gear 142. The planetary gears 144 are configured to revolve around the star gear 142. An annular gear 146 is positioned axially forward of the star gear 142 and planetary gears 144. As the planetary gears 144 rotate about the star gear 142, torque and power are transmitted to the annular gear 146. As shown, the annular gear 146 is operatively coupled to or otherwise integral with the propeller shaft 136. In some examples, the gear train 140 may further include additional planetary gears disposed radially between the plurality of planet gears 144 and the star gear 142 or between the plurality of planet gears 144 and the annular gear 146. In addition, the gear train 140 may further include additional annular gears.

As noted above, the core turbine engine 104 transmits power and torque to the propeller gearbox 134 via the power shaft 132. The power shaft 132 drives the star gear 142, which in turn drives the planetary gears 144 about the star gear 142. The planetary gears 144 in turn drive the annular gear 146, which is operatively coupled with the propeller shaft 136. In this way, the energy extracted from the power turbine 128 supports operation of the propeller shaft 136, and through the gear train 140, the relatively high RPM of the power shaft 132 is reduced to a more suitable RPM for the propeller assembly 106.

In addition, the gas turbine engine 100 includes one or more controllers 280 that control the core turbine engine 104 and the propeller assembly 106. For this example, the controller 280 is a single unit control device for a Full Authority Digital Engine (FADEC) system operable to provide full digital control of the core turbine engine 104, and in some examples, the propeller assembly 106. The controller 280 depicted in the illustrated example of FIGS. 1 and 2 can control various aspects of the core turbine engine 104 and the propeller assembly 106. For example, the controller 280 can receive one or more signals from sensory or data collection devices and can determine the blade angle of a plurality of propeller blades 150 (FIG. 1) about their respective pitch axes, as well as their rotational speed about the axial direction A based at least in part on the received signals. The controller 280 can in turn control one or more components of the gas turbine engine 100 based on such signals. For example, based at least in part on one or more speed or blade pitch signals (or both), the controller 280 can be operatively configured to control one or more valves such that an amount of hydraulic fluid can be delivered or returned from a pitch actuation assembly of the gas turbine engine 100 as will be described in greater detail herein. With reference to FIG. 1, the gas turbine engine 100 includes a sensor 162 positioned on a spinner 163 and a flange 137. In some examples, the sensor 162 is a beta sensor to detect the plurality of propeller blades 150 rotational position or the propeller speed. By rotating the plurality of propeller blades 150, a sensor handle positioned on the spinner 163 will rotate so when it passes under a tip of the sensor positioned on the flange 137, and depending on the angle of the blade, a different phase shifting to the electrical signal that is translated and sent to the controller 280.

With reference to FIG. 1, during operation of the gas turbine engine 100, a volume of air indicated by arrow 148 passes across the plurality of propeller blades 150 circumferentially spaced apart from one another along the circumferential direction C and disposed about the axial direction A, and more particularly for this example, the axial centerline 102. The propeller assembly 106 includes a spinner 163 aerodynamically contoured to facilitate an airflow through the plurality of propeller blades 150. The spinner 163 is rotatable with the plurality of propeller blades 150 about the axial direction A and encloses various components of the propeller assembly 106, such as e.g., the hub, propeller pitch actuator, piston/cylinder actuation mechanisms, etc. A first portion of air indicated by arrow 152 is directed or routed outside of the core turbine engine 104 to provide propulsion. A second portion of air 154 is directed or routed through the annular inlet 120 of the gas turbine engine 100. The flow of the second portion of air 154 is denoted by an arrow.

As shown in FIG. 2, the second portion of air 154 enters through the annular inlet 120 and flows downstream to the compressor section 110, which is a forward direction along the axial direction A in this example. The second portion of air 154 is progressively compressed as it flows through the compressor section 110 downstream toward the combustion section 112.

The compressed air 156, with flow indicated by an arrow, flows into the combustion section 112 where fuel is introduced, mixed with at least a portion of the compressed air 156, and ignited to form combustion gases 158. The combustion gases 158 flow downstream into the turbine section 114, causing rotary members of the turbine section 114 to rotate, which in turn supports operation of respectively coupled rotary members in the compressor section 110 and propeller assembly 106. In particular, the HPT 126 extracts energy from the combustion gases 158, causing the turbine blades to rotate. The rotation of the turbine blades of the HPT 126 causes the compressor shaft 130 to rotate, and as a result, the rotary components of the compressor are rotated about the axial direction A. In a similar fashion, the power turbine 128 extracts energy from the combustion gases 158, causing the blades of the power turbine 128 to rotate about the axial direction A. The rotation of the turbine blades of the power turbine 128 causes the power shaft 132 to rotate, which in turn drives the gear train 140 of the propeller gearbox 134.

The propeller gearbox 134 in turn transmits the power provided by the power shaft 132 to the propeller shaft 136 at a reduced RPM and desired amount of torque. The propeller shaft 136 in turn drives the propeller assembly 106 such that the plurality of propeller blades 150 rotate about the axial direction A, and more particularly for this example, the axial centerline 102 of the gas turbine engine 100. The exhaust gases, denoted by 160, exit the core turbine engine 104 through the exhaust outlets 122 to the ambient air.

It should be appreciated that the example gas turbine engine 100 described herein is provided by way of example only. For example, the engine may include another number and/or type of compressors (such as e.g., reverse flow and/or axial compressors), turbines, shafts, stages, etc. Additionally, in some examples, the gas turbine engine may include any suitable type of combustor, and may not include the example reverse-flow combustor depicted. It will further be appreciated that the engine can be configured as any suitable type of gas turbine engine, including, for example, turboshaft, turbojets, etc. Moreover, in yet other examples, the engine can be configured as a reciprocating or piston engine. In addition, it will be appreciated that the present subject matter can be applied to or employed with any suitable type of propeller or fan configuration, including, for example, tractor and pusher configurations.

Furthermore, although the gas turbine engine 100 described above is an aeronautical gas turbine engine for propulsion of a fixed-wing aircraft, the gas turbine engine may be configured as any suitable type of gas turbine engine for use in any number of applications, such as marine applications. Furthermore, the innovation could be used on other devices with variable pitch blades such as windmills. The propeller assembly 106 may rotate due to passing of a fluid, such as air or water, across the plurality of propeller blades 150 of the propeller assembly 106.

Figure 3A:
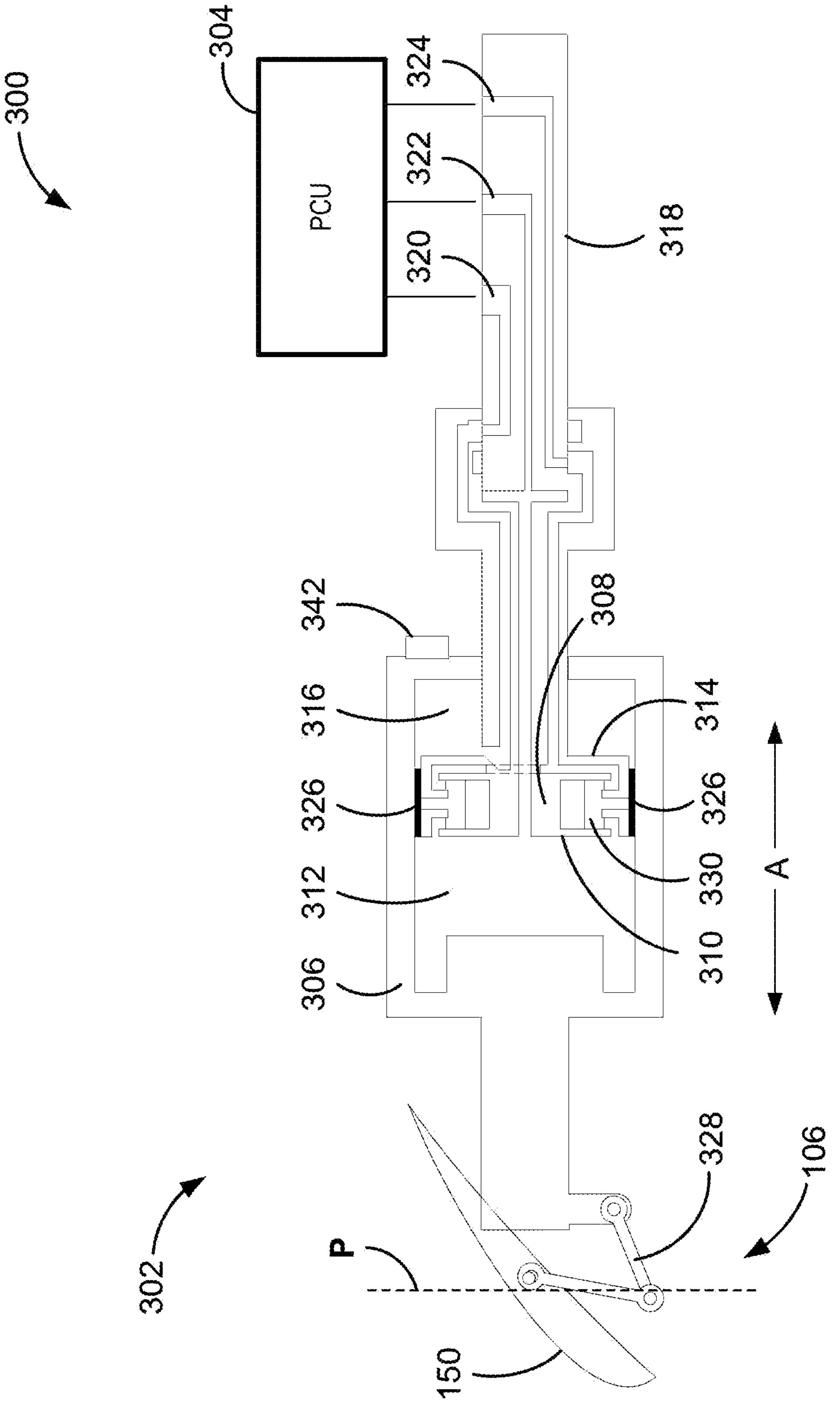
FIG. 3A is a schematic view of an example propeller control system of the gas turbine engine of FIG. 1.

FIG. 3A is a schematic view of an example propeller control system 300 for controlling the propeller assembly 106 of the gas turbine engine 100 of FIGS. 1 and 2. As depicted in FIGS. 1 and 2, the propeller assembly 106 is driven by the core turbine engine 104 (FIG. 2) by the propeller shaft 136. The propeller shaft 136 (FIG. 2) in turn drives a hub from which the plurality of propeller blades 150 extend outwardly from in the radial direction R. As the propeller shaft 136 rotates about the axial direction A, the hub in turn rotates the plurality of propeller blades 150 about the axial direction A. The propeller control system 300 includes features for controlling the rotational speed of the plurality of propeller blades 150 about the axial direction A and the pitch of the propeller blades 150, as well as features for protecting the components of the propeller assembly 106. As shown in FIG. 3A, the propeller control system 300 includes a pitch actuation assembly 302 and a propeller control unit (PCU) 304.

Generally, the pitch actuation assembly 302 is operatively configured to adjust the plurality of propeller blades 150 through a plurality of blade angles. Stated differently, the pitch actuation assembly 302 is operatively configured to rotate each propeller blade 150 about respective pitch axes P extending in the radial direction R (each pitch axis P is relative to a corresponding propeller blade 150). For the example of FIG. 3A, the pitch actuation assembly 302 is operatively configured to rotate the plurality of propeller blades 150 between high or coarse pitch blade angles, including a fully feathered blade angle to low or fine pitch blade angles. In this example, the pitch axis P is shown approximately vertical. As used herein, approximately vertical means within 5 degrees of vertical (e.g., perpendicular to the ground). However, in some examples the pitch axis is positioned 10-30 degrees from vertical. As shown in FIG. 3A, the plurality of propeller blades 150 are in a typical flight position (e.g., at an angle approximately 60 degrees from the pitch axis P). Moreover, for this example, the pitch actuation assembly 302 is additionally operatively configured to rotate the plurality of propeller blades 150 through reverse pitch angles, which can be useful for ground or taxiing operations, particularly where an aircraft includes multiple engines. In some examples, the reverse position is defined as the plurality of propeller blades 150 at an angle −20 to −5 degrees from vertical. In this regard, the example propeller assembly 106 depicted in FIG. 3A is a variable pitch, full feathering, and reverse enabled propeller assembly, and more particularly still, the propeller assembly is configured as a variable pitch constant-speed, full feathering, reverse enabled propeller assembly. In some examples, the propeller control system 300 includes a sensor 342 to detect a displacement of the piston. In some examples, the sensor 342 is a linear variable differential transformer (LVDT) sensor.

Pitch actuation assembly 302 of FIG. 3A includes a housing, cylinder, or propeller dome 306 that defines an interior chamber and encloses a control piston 308 that is translatable along the axial direction A within the chamber of the propeller dome 306. In particular, the propeller dome 306 and the outboard side 310 of the control piston 308 define a first side of the interior chamber 312 and the propeller dome 306. The inboard side 314 of the control piston 308 and the propeller dome 306 define a second side of the interior chamber 316. The control piston 308 separates the first side of the interior chamber 312 (e.g., coarse chamber) from the second side of the interior chamber 316 (e.g., fine chamber) of the chamber along the axial direction A. In some examples, the first side of the interior chamber 312 (e.g., coarse chamber) actuating area is larger than the second side of the interior chamber 316 (e.g., fine chamber) actuating area. The control piston 308 is operatively coupled with a piston rod 318 that extends along the axial direction A. In particular, the piston rod 318 extends from the propeller assembly 106 (where the piston rod 318 is connected to the control piston 308) to the PCU 304 along the axial direction A. The piston rod 318 and the control piston 308 are translatable in unison. The piston rod 318 encloses three hydraulic fluid transfers or beta tubes that also extend along the axial direction A. The first of the three hydraulic fluid transfers or beta tubes is a fine line 320, the second is a coarse line 322, and the third is a pitch lock line 324. The fine line 320 transfers hydraulic fluid to the second side 316 (e.g., fine chamber) and the coarse line 322 transfers hydraulic fluid to the first side 312 (e.g., coarse chamber). To control the blade angles of the plurality of propeller blades 150, hydraulic fluid (e.g., oil) can be fed through the fine line 320 and/or the coarse line 322 to the second side 316 of the chamber or to the first side 312 of the chamber in a double-acting system to translate the control piston 308 along the axial direction A. Depending on the desired blade pitch, hydraulic fluid can enter and exit the fine line 320 and the coarse line 322. Due to use and wear of the control piston 308, a gap can occur between the propeller dome 306 and a seal 326 causing seal failure. When seal failure occurs, hydraulic fluid supplied to the first side 312 (e.g., coarse chamber) passes through the seal and is drained from the first side 312 (e.g., coarse chamber) to the second side 316 (e.g., fine chamber) of the chamber. External loads overcome the first side 312 (e.g., coarse chamber) pressure and push an actuator 328 towards fine pitch, which is a hazardous condition because the plurality of propeller blades 150 may break during high rotational speeds. When the actuator 328 pushes towards fine pitch without being commanded, the PCU 304 engages the pitch lock line 324 to supply hydraulic fluid to a pitch lock mechanism 330 (described in more detail in FIG. 3B) and prevents the plurality of propeller blades 150 from pitch fining. In prior methods, counterweights or springs automatically push the propeller towards feather in case of seal failure. The PCU 304 has the capability to supply hydraulic fluid to the first side 312 (e.g., coarse chamber) while blocking the second side 316 (e.g., fine chamber) flow. Additionally, in some examples, the PCU 304 does this independent of the pitch lock line 324 capability. Thus, feather capability is guaranteed in the case of failure seals between the first side 312 (e.g., coarse chamber) to the second side 316 (e.g., fine chamber) of the chamber independent of counterweights and springs because the first side 312 is larger than the second side 316 and the PCU 304 blockage capability. In return, reducing the weight of the aircraft.

Figure 3B:
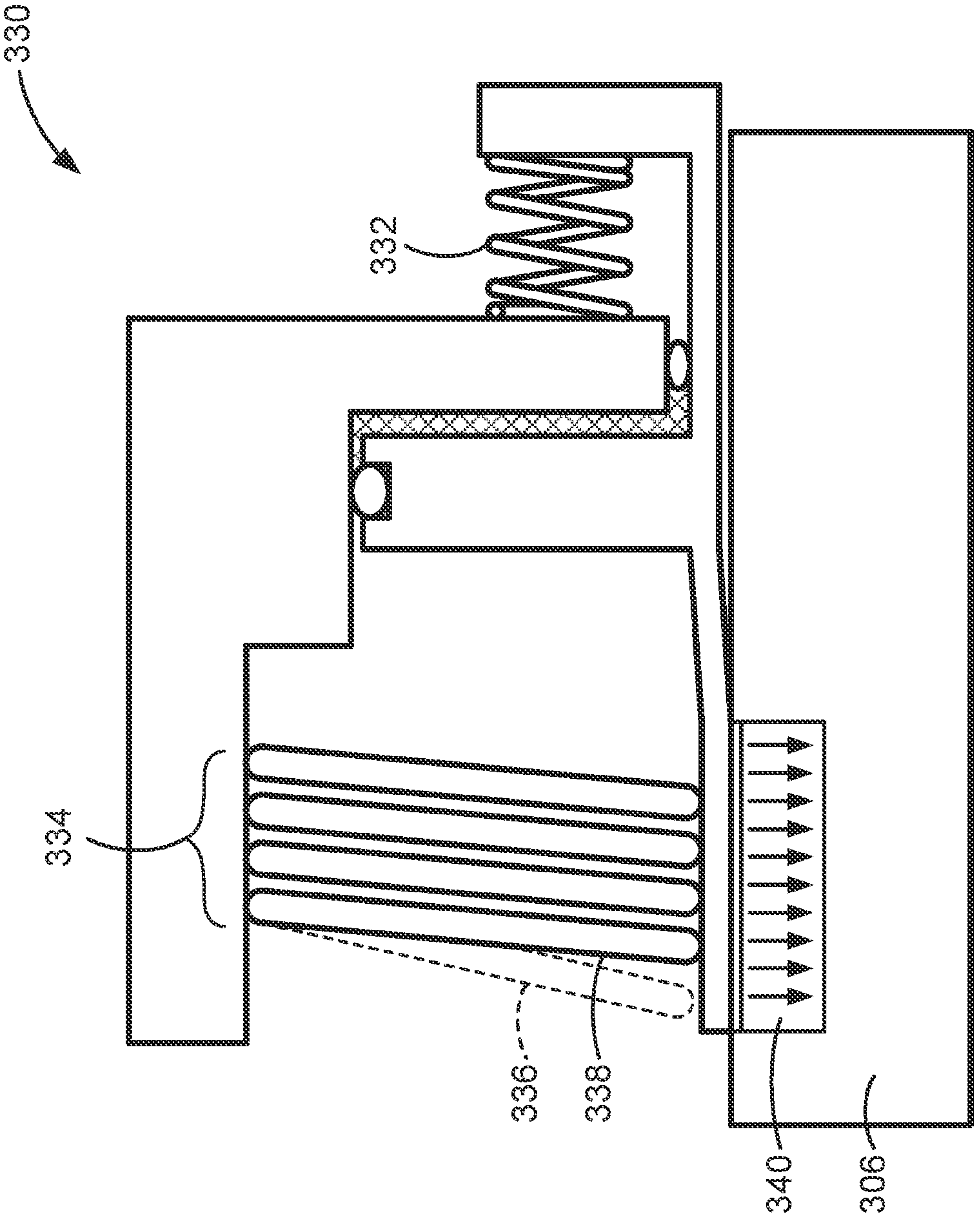
FIG. 3B is a schematic view of a pitch lock mechanism of FIG. 3A.

FIG. 3B is a schematic view of the pitch lock mechanism 330 in FIG. 3A. The pitch lock mechanism 330 locks the plurality of propeller blades 150 (FIG. 1) from moving to the reverse position. When seal failure occurs, hydraulic fluid is supplied through the pitch lock line 324 (shown in FIG. 3A) causing a spring 332 to compress and plates 334 to move from a first position 336 to a second position 338. The plates 334 in the second position 338 cause a force 340 on the propeller dome 306. In some examples, the force 340 is a high friction force preventing the piston from moving.

Figure 4:
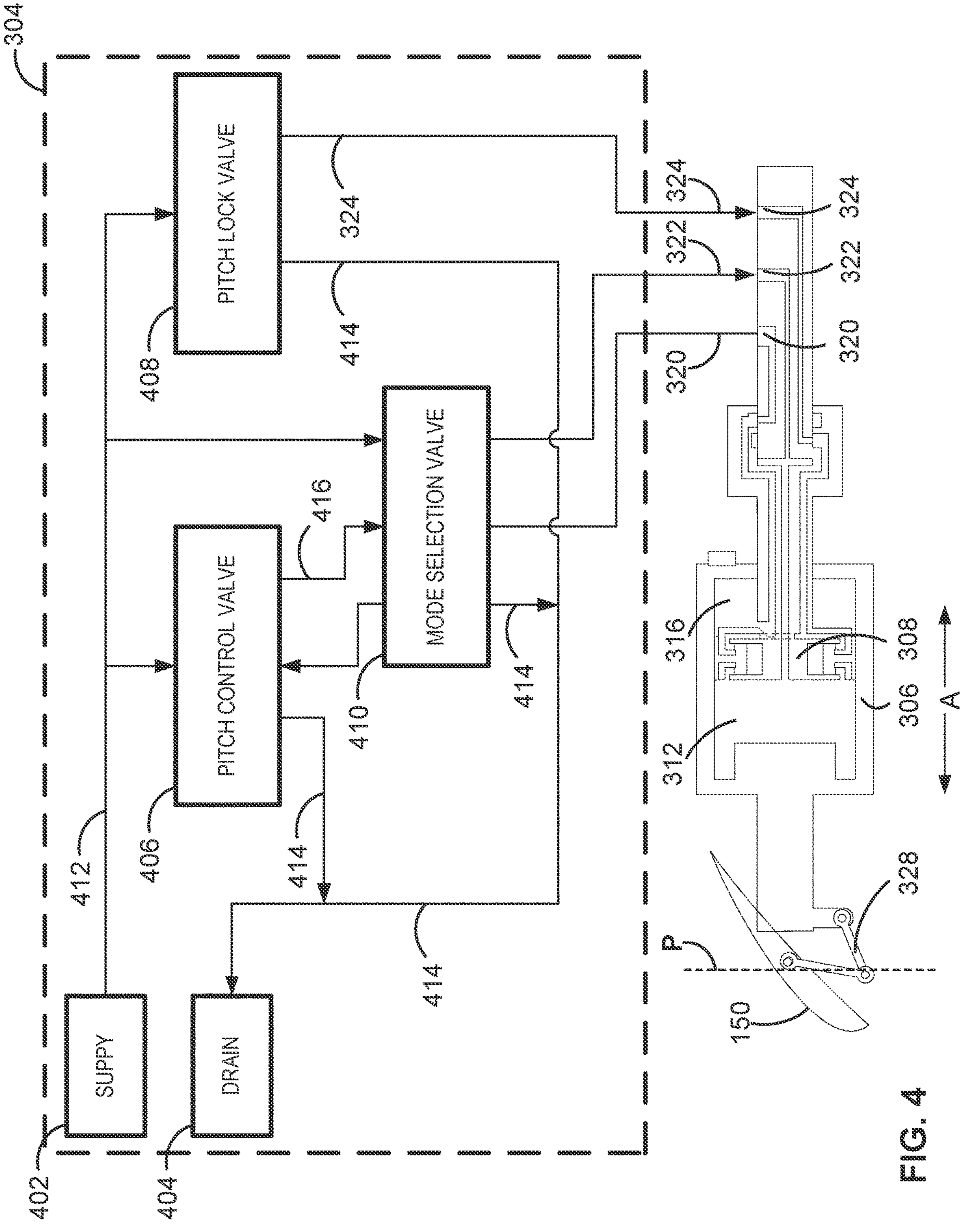
FIG. 4 is a schematic view of an example propeller control unit of FIG. 3A.

FIG. 4 is a schematic view of the example propeller control unit (PCU) 304 of FIG. 3A. The PCU 304 includes a supply 402 and a drain 404 for providing hydraulic fluid to the fine line 320, the coarse line 322, and the pitch lock line 324. In some examples, hydraulic fluid is drained via the fine line 320 when fine pitch is desired. The supply 402 and the drain 404 are controlled by three control valves: a pitch control valve 406, a pitch lock valve 408, and a mode selection valve 410. The pitch control valve 406, the pitch lock valve 408, and the mode selection valve 410 are fed hydraulic fluid via a supply line 412 and drain hydraulic fluid via a drain line (e.g., return line) 414. The pitch control valve 406 selectively allows, based on one or more input signals, hydraulic fluid to flow to the mode selection valve 410 via a pitch control supply line 416. The mode selection valve 410 is a three-state valve to feed the coarse line 322 or the fine line 320 based on one or more input signals. In some examples, the mode selection valve 410 allows the pitch lock valve 408 to be independent of both the pitch control valve 406 and the mode selection valve 410.

When the mode selection valve 410 receives a signal or input signals to pitch the plurality of blades 150 to increase the propeller blade angle (e.g., feather pitch), the mode selection valve 410 supplies hydraulic fluid to the coarse line 322 to create high pressure in the first side 312 (e.g., coarse chamber). In some examples, this is referred to as a feather command. This pressure forces the control piston 308 to the right and the actuator 328 moves the plurality of blades 150 towards feather. Additionally, hydraulic fluid drains via the fine line 320, which returns the hydraulic fluid to the mode selection valve 410. The mode selection valve 410 diverts the hydraulic fluid to the drain line 414, which returns the hydraulic fluid to the drain 404.

However, if there is a seal failure (e.g., hydraulic fluid leaking from the first side 312 to the second side 316) at seal 326, the feather command will be ineffective because the pressure in the first side 312 (e.g., coarse chamber) is no longer able to overcome the external load on the plurality of propeller blades 150. In some examples, the failure is detected by a sensor, and a signal is sent to the pitch lock valve 408 to engage and supply hydraulic fluid via the pitch lock line 324, which locks the plurality of propeller blades 150 from pitching towards the fine direction (e.g., moving towards parallel with the P-axis). In some examples, a sensor located on the plurality of propeller blades 150 compared to a control system set point is used to detect failure. In other examples, a sensor located on the propeller dome 306 compared to the control system set point is used to detect failure. In some examples, sensors on the fine line 320 and the coarse line 322 are used to detect failure. In some examples, the sensor may be one of a variable reluctance sensor, a pressure sensor, or a variable differential transducer sensor. To overcome this failure, the mode selection valve 410 engages a fine line blockage (described in more detail in FIGS. 5-7 below). The fine line blockage blocks hydraulic fluid from being drained or supplied through the fine line 320 and the coarse line 322 is supplied with hydraulic fluid to pressurize the first side 312 (e.g., coarse chamber). The fine line blockage removes the drainage path on the fine line 320, and thus, as the first side 312 (e.g., coarse chamber) is being pressurized the second side 316 (e.g., fine chamber) is prevented from draining. Thus, the pressure is increased in both chambers to overcome the seal leakage from the first side 312 (e.g., coarse chamber) from the second side 316 (e.g., fine chamber).

In some examples, the lack of drainage from the second side 316 (e.g., fine chamber) causes the hydraulic fluid to leak through the seal failure of the seal 326 from the second side 316 (e.g., fine chamber) to the first side 312 (e.g., coarse chamber). The leakage of fluid from the second side 316 causes hazardous conditions because the leakage of fluid allows the control piston 308 to move towards the second side 316 (e.g., fine chamber). If pitch coarsening or feathering is commanded in the presence of fluid leakage, the command is ineffective due to the leakage. On the other hand, if fine line blockage is commanded, then feathering functionality is restored, as the fine line 320 is blocked, the oil in the first side 312 is pressurized, the oil in the second side 316 is pressurized by the control piston 308 motion and is pushed out of the second side 316 through the failed seal, and the control piston 308 continues to move up to full feather position. Thus, the increased pressure allows the control piston 308 to overcome the external loads and regain pitch feathering capability.

In some examples, the second side 316 (e.g., fine chamber) flow is larger than the first side 312 (e.g., coarse chamber). In some examples, the mode selection valve 410 operates independently of the pitch lock valve 408 functionality. In other examples, the pitch lock functionality of the pitch lock valve 408 is included in the mode selection valve 410, and, as a result, one of a fine line blockage state, a nominal state, or a feather state (described further below in connection with FIGS. 5A-7) is provided via the mode selection valve 410 operating as an independent valve. In some examples, the pitch lock valve 408 is a solenoid valve.

Figure 5A:
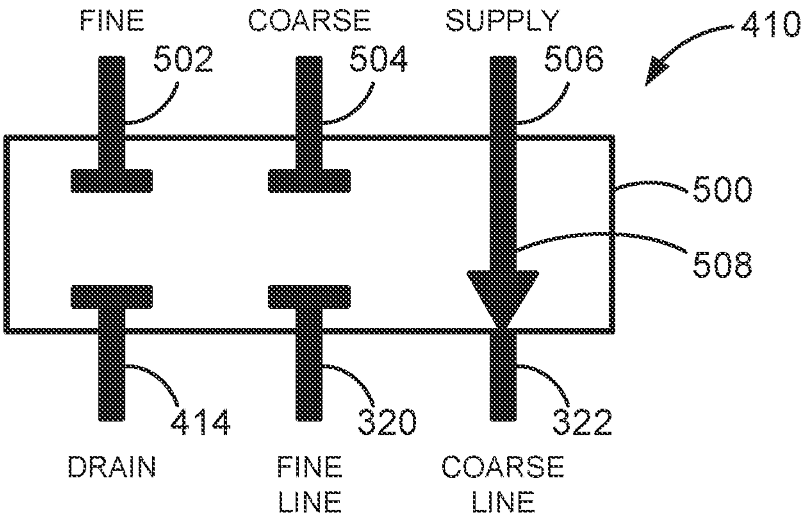
FIG. 5A is a schematic view of a mode selection valve depicted in a fine line blockage state, according to one example shown and described herein.

The mode selection valve 410 has three states that are illustrated in FIGS. 5A-7. FIG. 5A is a schematic view of the mode selection valve 410 depicted in a fine line blockage state 500. As described above, the fine line blockage state 500, also referred to as a first state, blocks or prevents hydraulic fluid from being drained or supplied through the fine line 320 and the coarse line 322 is supplied with hydraulic fluid to pressurize the first side 312 (e.g., coarse chamber) when seal failure condition is detected. As shown in FIG. 5A, the fine line 320 is blocked to prevent hydraulic fluid from flowing through the fine line 320. In the fine line blockage state 500, the drain line 414 is blocked as well to ensure the second side 316 (e.g., the fine chamber) (FIG. 4) is pressured to force the hydraulic fluid within to flow through the seal failure from the second side 316 (e.g., the fine chamber) to the first side 312 (e.g., the coarse chamber) (FIG. 4), if not at all. The coarse line 322 is supplied with hydraulic fluid to pressurize the first side 312 (e.g., coarse chamber). As shown in FIGS. 5A-7, the mode selection valve 410 includes three supply lines: a fine valve line 502, a coarse valve line 504, and a supply valve line 506. As shown in the example of FIG. 5A, the supply valve line 506, also referred to as the first valve line, allows the mode selection valve 410 to supply hydraulic fluid to the coarse line 322, also referred to as the first piston line, via a port 508 during the seal failure condition.

Figure 5B:
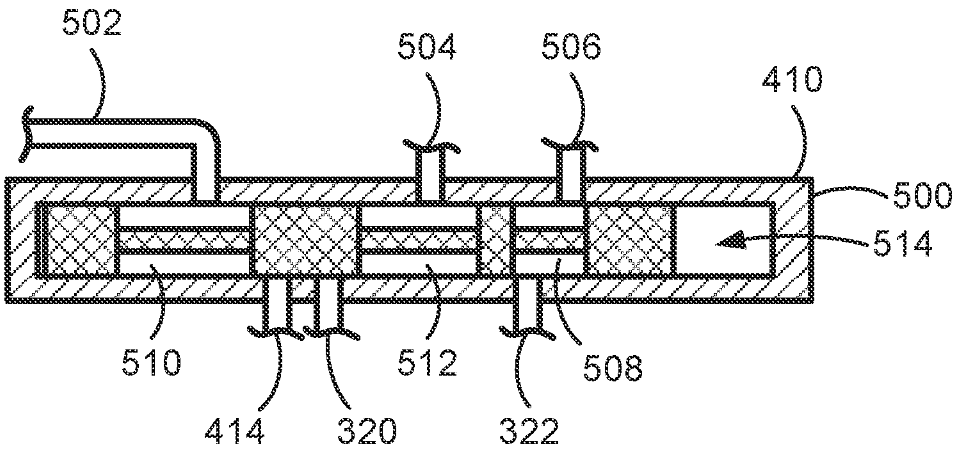
FIG. 5B is an example configuration of the mode selection valve in the fine line blockage state shown in FIG. 5A.

FIG. 5B is an example configuration of the internal valve components of the mode selection valve 410. In this example, the mode selection valve 410 is shown in the fine line blockage state 500, also shown in FIG. 5A. This example configuration illustrates a translating spool 514 that includes ports 508, 510, 512. The translating spool 514 translates, slides, and/or moves within the seal feather valve to align the ports 508, 510, 512 with the supply lines, the fine line 320, the coarse line 322, and/or the drain line 414. In FIG. 5B, the supply valve line 506 and the coarse line 322 are aligned via the port 508. This allows the hydraulic fluid to enter the mode selection valve 410 via the supply valve line 506 and exit via the coarse line 322. Furthermore, the fine valve line 502 and the coarse valve line 504 do not align with one of the ports 508, 510, 512. As such, hydraulic fluid is blocked or prevented from transferring via the fine valve line 502 and the coarse valve line 504.

Figure 6:
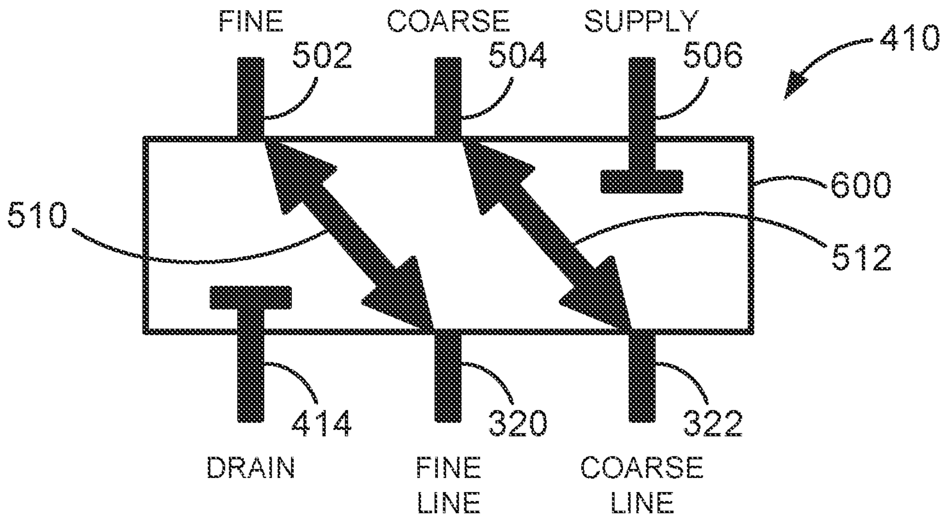
FIG. 6 is a schematic view of a mode selection valve depicted in a nominal state, according to one example shown and described herein.

FIG. 6 is a schematic view of the mode selection valve 410 depicted in a nominal state 600. The nominal state 600, also referred to as a second state, is the normal operation mode of the mode selection valve 410 when a seal failure condition has not occurred. During the nominal state 600, hydraulic fluid can flow through the fine valve line 502 to the fine line 320 via a port and the coarse valve line 504 to the coarse line 322 via the port 512, respectively.

Figure 7:
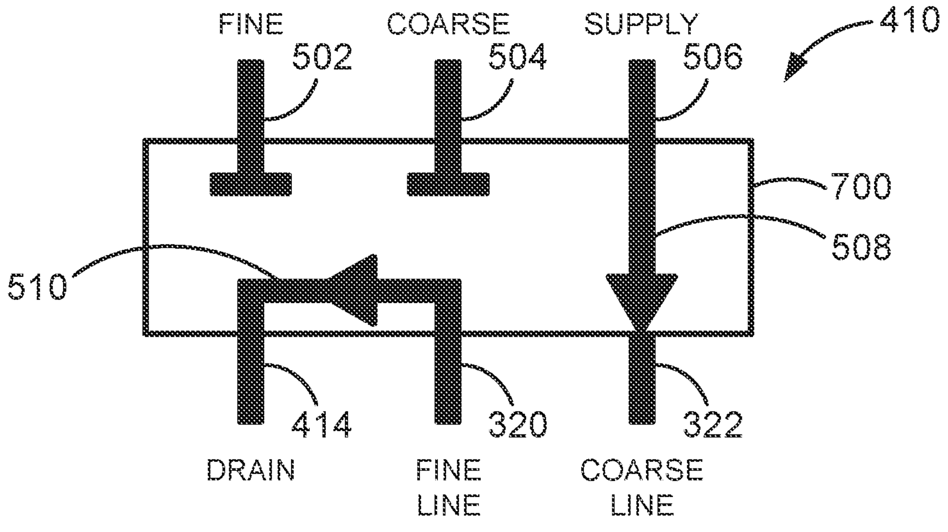
FIG. 7 is a schematic view of a mode selection valve depicted in a feather state, according to one example shown and described herein.

FIG. 7 is a schematic view of the mode selection valve 410 depicted in a feather state 700, also referred to as a third state. As mentioned previously, feathering refers to movement of the blade pitch angle increasing to the point that the chord line of the blade is approximately parallel to the on-coming airflow, and the feather state 700 is the state of the mode selection valve 410 to force the blade to feather pitch angle. The feather state 700 is the hydraulic flow through the mode selection valve 410 when the seal failure is not detected. As shown in FIG. 7, in the feather state 700 the supply valve line 506 allows the hydraulic fluid to flow to the coarse line 322 via the port 508 and the fine line 320 is routed to the drain line 414 via the port 510. This configuration, the feather state 700, allows for the first side 312 (e.g., the coarse chamber) (FIG. 3A) to fill with hydraulic fluid, pressuring the first side 312 (e.g., the coarse chamber), and hydraulic fluid to be returned from the second side 316 (e.g., fine chamber) to the mode selection valve 410 via the fine line 320 and out through the drain line 414. The mode selection valve 410 is commanded to operate in the three states via predetermined valve currents. In other words, each state corresponds to a particular current level.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

Figure 8:
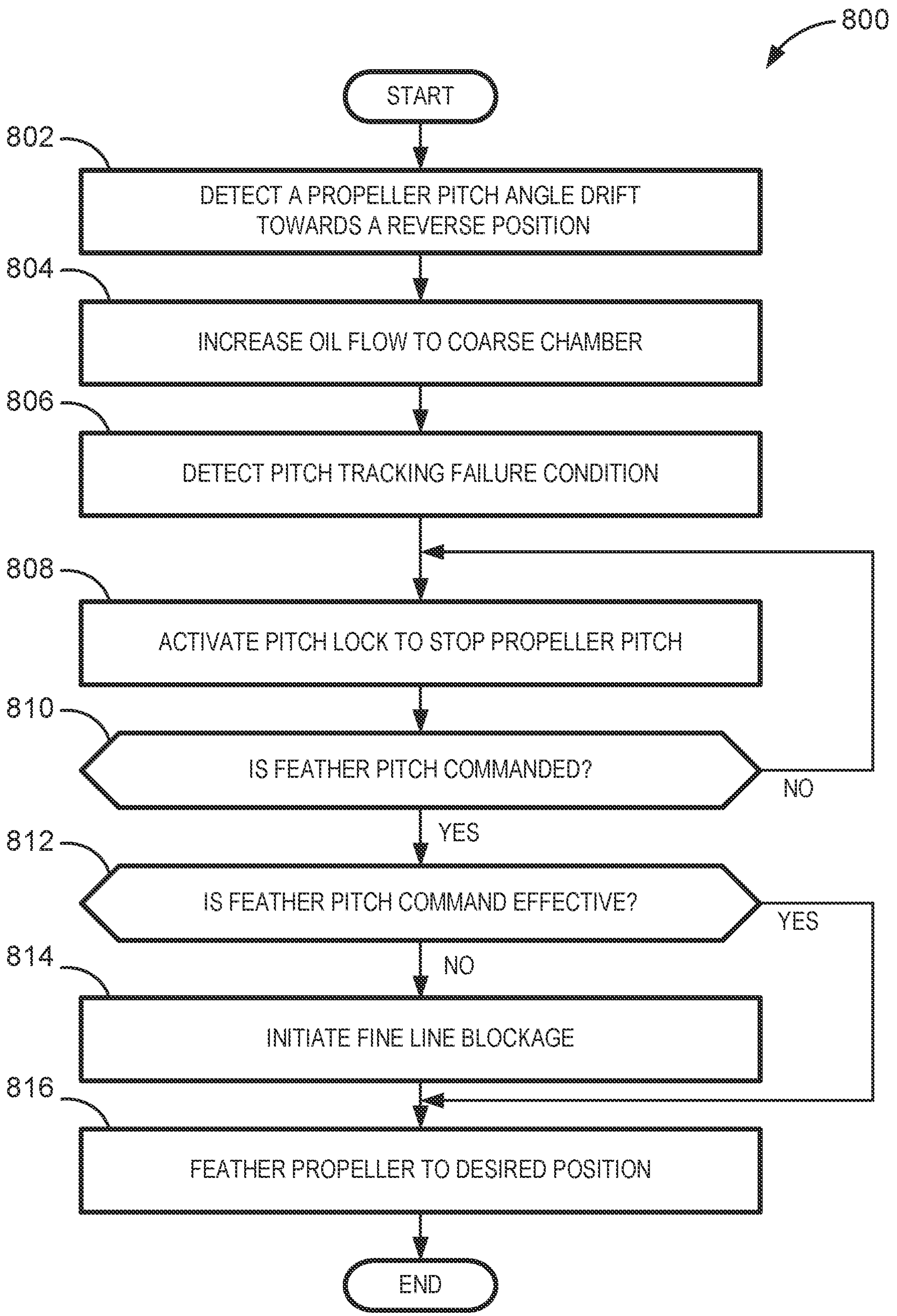
FIG. 8 is a flowchart representative of example machine readable instructions or example operations that may be executed, instantiated, or performed by example programmable circuitry.
Figure 10:
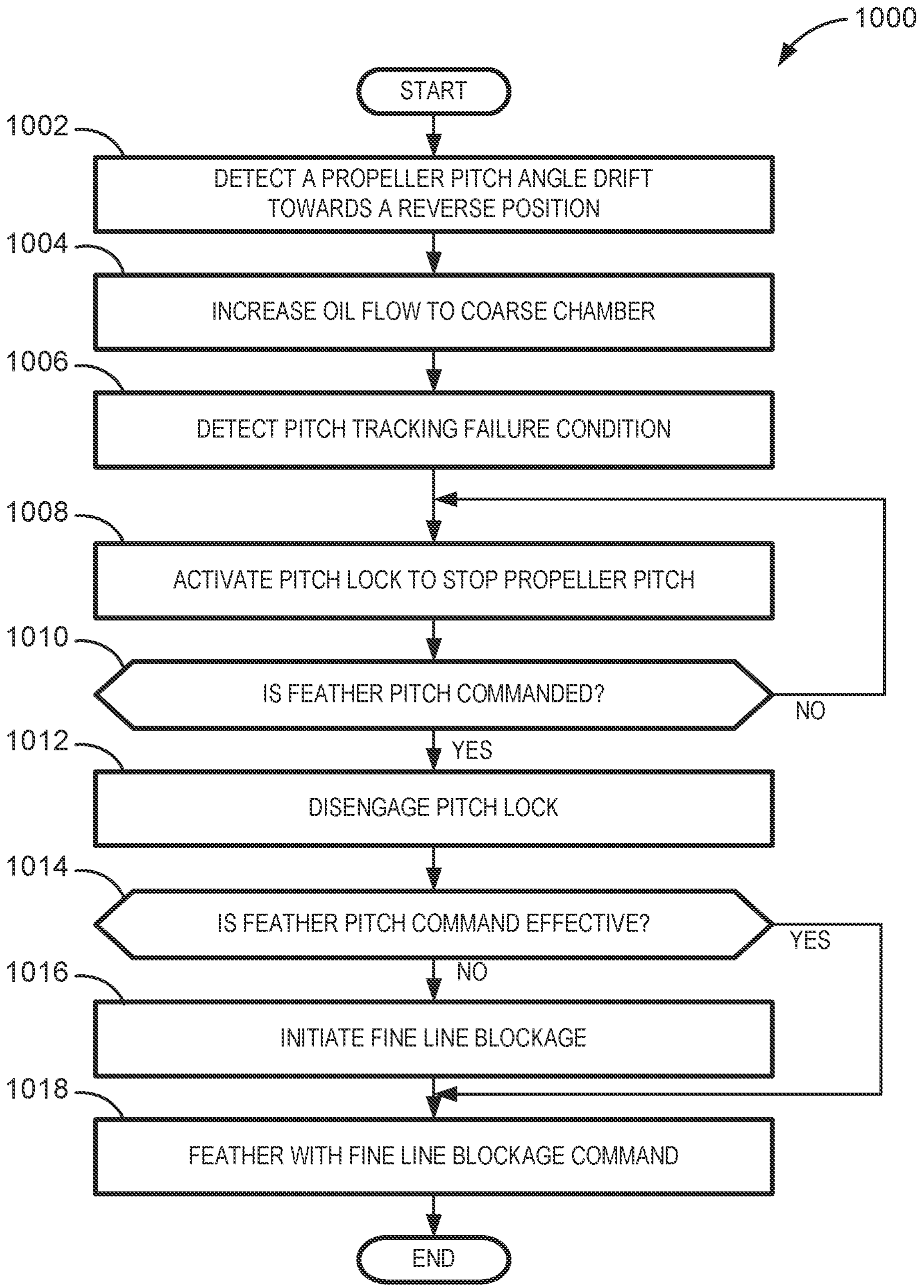
FIG. 10 is a flowchart representative of example machine readable instructions or example operations that may be executed, instantiated, or performed by example programmable circuitry.

The example operations of FIGS. 8 and 10 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms “non-transitory computer readable storage device” and “non-transitory machine readable storage device” are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term “device” refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 8 is a flowchart representative of example machine readable instructions and/or example operations 800 that may be executed, instantiated, and/or performed by programmable circuitry to control the PCU 304. The example machine-readable instructions and/or the example operations 800 of FIG. 8 begin at block 802, at which the one or more sensors detects a propeller pitch angle drift towards fine direction. In some examples, a drift can indicate that the propeller pitch angle is moving to and/or motions toward the fine direction for a period of time. In some examples, the period of time is a range of 0.5 second and 3 seconds. In other examples, drift can be defined as movement or motion of the propeller pitch angle to the fine direction by certain number of degrees. In some examples, the number of degrees is a range of 0.5 degrees and 5 degrees. In some examples, the propeller corresponds to the plurality of propeller blades 150 in FIGS. 1 and 3-4. At block 804, oil and/or hydraulic fluid is increased to flow to the coarse chamber. In some examples, the coarse chamber corresponds to the first side 312 in FIGS. 3 and 4. At block 806, a pitch tracking failure condition is detected. In some instances, pitch tracking failure condition is caused by a seal failure at the seal 326 between the control piston 308 (FIG. 3A) and the propeller dome 306 (FIG. 3A). At block 808, a pitch lock is activated to stop the propeller pitch. In some examples, the pitch lock corresponds to the pitch lock valve 408 (FIG. 4). At block 810, a control logic test whether feather pitch is commanded. In some examples, the feather pitch command is a request to pitch the plurality of propeller blades 150 (FIG. 1) to increase the propeller blade angle between the plurality of propeller blades 150 and the P-axis (FIG. 3A). If feather pitch is not commanded, the control logic loops to block 808. If feather pitch is commanded, the control logic test if the feather pitch command is effective (block 812). If the feather pitch command is effective, the control logic feathers the propeller to desired position (block 816). In some examples, if the feather pitch command is effective then the angle of plurality of propeller blades 150 increases between the plurality of propeller blades 150 and the P-axis. If the feather pitch command is ineffective, the control logic initiates fine line blockage (block 814). In some examples, if the feather pitch command is ineffective then the angle does not increase between the plurality of propeller blades 150 and the P-axis. In some examples, the fine line blockage corresponds to the fine line blockage state 500 of the mode selection valve 410, shown in FIG. 5A. In some instances, the mode selection valve 410 is actuated, controlled, and/or operated to the fine line blockage state 500. Once the fine line blockage is initiated, the propellers are feathered to desired position (block 816). Thereafter, the example method of FIG. 8 ends and the control of the example PCU 304 resumes in normal conditions until another command or failure is detected.

Figure 9:
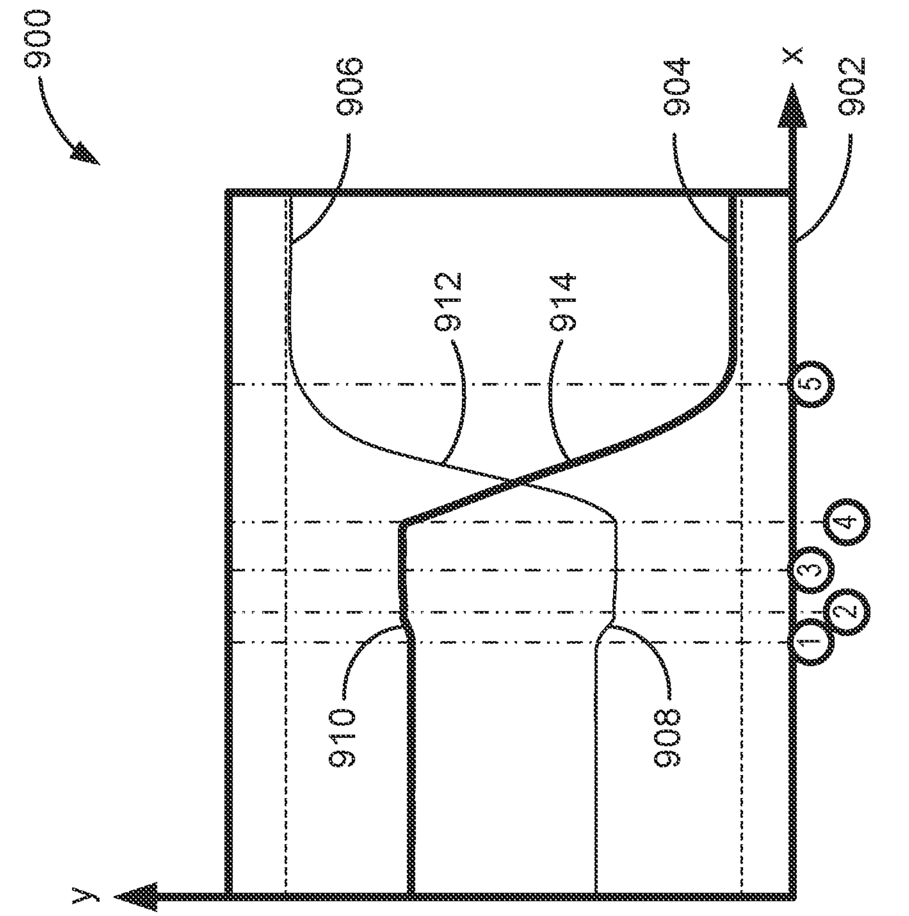
FIG. 9 illustrates a graphic view of example control logic of FIG. 8, according to one or more examples shown and described herein.

FIG. 9 illustrates a graphic view 900 of example operations 800 of FIG. 8 to adjust the plurality of propeller blades 150 (FIG. 1) pitch angle when the pitch lock valve 408 is an independent valve. The x-axis represents time 902 and the y-axis represents the change in value of propeller pitch angle 904 and propeller RPM 906, thus the change in value over time can be charted for the propeller pitch angle 904 and the propeller RPM 906 prior to point 1 on the graphic view 900, the propeller pitch angle 904 and the propeller RPM 906 are constant. At point 1, a seal failure is detected. In some examples, the seal failure detection at point 1 corresponds to block 802 of FIG. 8. After point 1, the propeller pitch angle 904 begins to decrease at a first pitch slope 908 and the propeller RPM 906 begins to increase at a first RPM slope 910. At point 2, a pitch lock is activated. In some examples, point 2 corresponds to block 808 of FIG. 8. Due to the pitch lock activation at point 2, the propeller pitch angle 904 and the propeller RPM 906 remain constant. At point 3, a feather pitch is commanded. At point 4, the plurality of propeller blades 150 are feathered with fine line blockage (described in FIG. 5A). In some examples, the hydraulic fluid is increased with the mode selection valve 410 in the fine line blockage state 500 described in FIG. 5A. After point 4, the propeller pitch angle 904 begins to increase at a second pitch slope 912 and the propeller RPM 906 begins to decrease at a first RPM slope 914. At point 5, the plurality of propeller blades 150 reach a desired pitch angle. Thus, after point 5 the propeller pitch angle 904 and the propeller RPM 906 remain constant.

FIG. 10 is a flowchart representative of example machine readable instructions and/or example operations 1000 that may be executed, instantiated, and/or performed by programmable circuitry to control the PCU 304. The example machine-readable instructions and/or the example operations 1000 of FIG. 10 begin at block 1002, at which the one or more sensors detects a propeller pitch angle drift towards fine. In some examples, drift is defined as movement or motion of the propeller pitch angle toward the fine direction for a period of time. In some examples, the period of time is a range of 0.5 second and 3 seconds. In other examples, drift can be defined as movement or motion of the propeller pitch angle toward the fine direction by certain number of degrees. In some examples, the number of degrees is a range of 0.5 degrees and 5 degrees. At block 1004, oil and/or hydraulic fluid is increased to flow to coarse chamber. In some examples, the hydraulic fluid is increased with the mode selection valve 410 in the nominal state 600 as shown and described in FIG. 6. At block 1006, pitch tracking failure condition is detected. In some instances, pitch tracking failure condition is caused by seal failure between the control piston 308 (FIG. 3A) and the propeller dome 306 (FIG. 3A). At block 1008, a pitch lock is activated to stop the propeller pitch. In some examples, the pitch lock corresponds to the pitch lock valve 408 (FIG. 4). At block 1010, a control logic tests whether feather pitch is commanded. If feather pitch command is not requested, the control logic loops to block 1008. If feather pitch is commanded, the control logic disengages the pitch lock (block 1012). At block 1014, a control logic test whether the feather pitch command is effective. If the feather pitch command is effective the control logic feathers the propeller to desired position (block 1018). In some examples, if the feather pitch command is effective the control logic positions the mode selection valve 410 in the feather state 700 as shown and described in FIG. 7. If the feather pitch command is ineffective, the controls logic initiates fine line blockage (block 1016). In some examples, the fine line blockage corresponds to the fine line blockage state 500 of the mode selection valve 410, shown in FIG. 5A. Once the fine line blockage is initiated, the propeller is feathered to desired position (block 1018). Thereafter, the example method of FIG. 10 ends and the control of the example PCU 304 resumes in normal conditions until another command or failure is detected.

Figure 11:
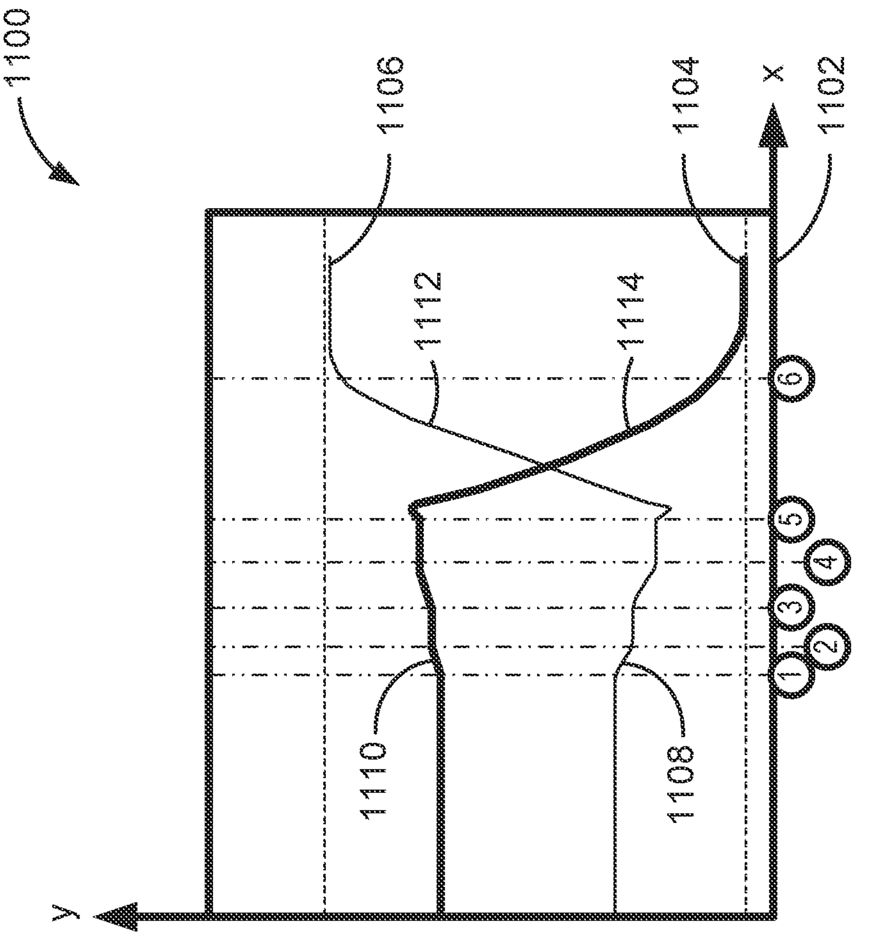
FIG. 11 illustrates another graphic view of example control logic of FIG. 10, according to one or more examples shown and described herein.

FIG. 11 illustrates a graphic view 1100 of example control logic 1000 of FIG. 10 to adjust the plurality of propeller blades 150 (FIG. 1) pitch angle. The x-axis represents time 1102 and the y-axis represents the value of propeller pitch angle 1104 and propeller RPM 1106. Prior to point 1 on the graphic view 1100, the propeller pitch angle 1104 and the propeller RPM 1106 are constant. At point 1, a seal failure is detected. In some examples, the seal failure detection at point 1 corresponds to block 1002 of FIG. 10. In some examples, the hydraulic fluid is increased with the mode selection valve 410 in the nominal state 600 as shown and described in FIG. 6. After point 1, the propeller pitch angle 1104 begins to decrease at a first pitch slope 1108 and the propeller RPM 1106 begin to increase at a first RPM slope 1110. At point 2, a pitch lock is activated. In some examples, point 2 corresponds to block 1008 of FIG. 10. Due to the pitch lock activation at point 2, the propeller pitch angle 904 and the propeller RPM 906 remain constant. At point 3, a feather pitch is commanded, and the pitch lock is disengaged. Due to the pitch lock functionality not included in an independent valve, the pitch lock needs to be disengaged before initiating feathering. In some examples, point 3 corresponds to blocks 1010 and 1012 of FIG. 10. At point 4, the pitch lock is re-engaged. In some examples, the pitch lock is re-engaged because pitch tracking failure is detected again. At point 5, the plurality of propeller blades 150 are feathered with fine line blockage (described in FIG. 5A). In some examples, the hydraulic fluid is increased with the mode selection valve 410 in the fine line blockage state 500 described in FIG. 5A. After point 5, the propeller pitch angle 1104 begins to increase at a second pitch slope 1112 and the propeller RPM 1106 begins to decrease at a second RPM slope 1114. At point 6, the plurality of propeller blades 150 reach a desired pitch angle. Thus, after point 6 the propeller pitch angle 1104 and the propeller RPM 1106 remain constant. Due to the pitch lock functionality not being an independent valve (e.g., pitch lock is not independent from feather functionality), the propeller pitch angle 1104 continues to increase and the propeller RPM 1106 continues to decrease between points 2 to 5. In contrast, the propeller pitch angle 904 and the propeller RPM 906 are constant between points 2 to 4, as shown in the graphic view 900 of FIG. 9 where the pitch lock valve 408 is an independent valve.

Figure 12:
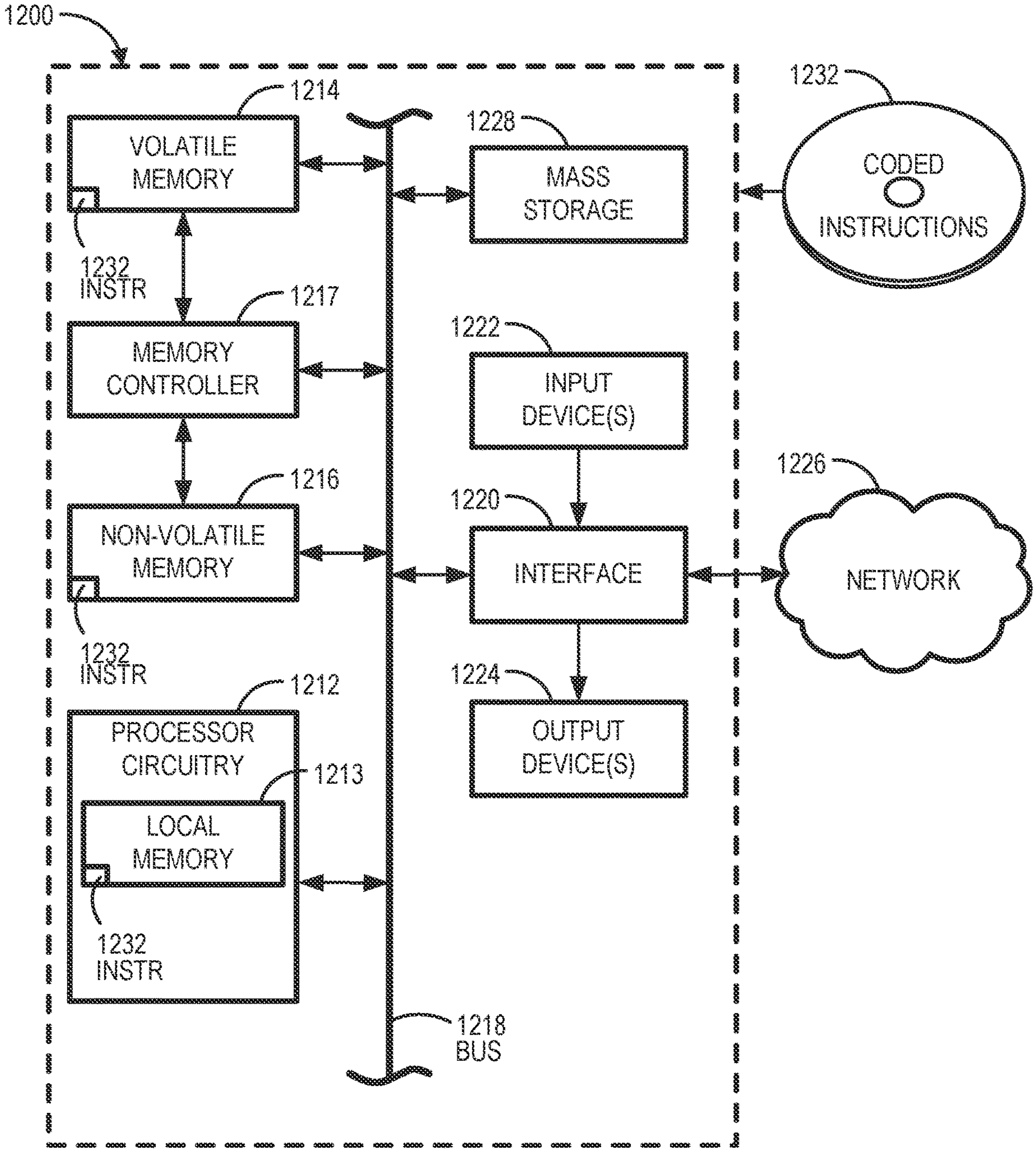
FIG. 12 is a block diagram of an example processing platform including programmable circuitry structured to execute, instantiate, or perform the example machine readable instructions or perform the example operations of FIGS. 8 and 10.

FIG. 12 is a block diagram of an example programmable circuitry platform 1200 structured to execute and/or instantiate the example machine-readable instructions and/or the example operations of FIGS. 8 and 10. The programmable circuitry platform 1200 can be, for example, a server, a personal computer, a workstation, a self-learning machine (e.g., a neural network), a mobile device (e.g., a cell phone, a smart phone, a tablet such as an iPad™), etc.) or other wearable device, or any other type of computing and/or electronic device.

The programmable circuitry platform 1200 of the illustrated example includes programmable circuitry 1212. The programmable circuitry 1212 of the illustrated example is hardware. For example, the programmable circuitry 1212 can be implemented by one or more integrated circuits, logic circuits, FPGAs, microprocessors, CPUs, GPUs, DSPs, and/or microcontrollers from any desired family or manufacturer. The programmable circuitry 1212 may be implemented by one or more semiconductor based (e.g., silicon based) devices.

The programmable circuitry 1212 of the illustrated example includes a local memory 1213 (e.g., a cache, registers, etc.). The programmable circuitry 1212 of the illustrated example is in communication with main memory 1214, 1216, which includes a volatile memory 1214 and a non-volatile memory 1216, by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217. In some examples, the memory controller 1217 may be implemented by one or more integrated circuits, logic circuits, microcontrollers from any desired family or manufacturer, or any other type of circuitry to manage the flow of data going to and from the main memory 1214, 1216.

The programmable circuitry platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user (e.g., a human user, a machine user, etc.) to enter data and/or commands into the programmable circuitry 1212.

One or more output devices 1224 are also connected to the interface circuitry 1220 of the illustrated example. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1200 of the illustrated example also includes one or more mass storage discs or devices 1228 to store firmware, software, and/or data. Examples of such mass storage discs or devices 1228 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1232, which may be implemented by the machine readable instructions of FIGS.

8 and 10, may be stored in the mass storage device 1228, in the volatile memory 1214, in the non-volatile memory 1216, and/or on at least one non-transitory computer readable storage medium such as a CD or DVD which may be removable.

From the foregoing, it will be appreciated that example systems, apparatus, articles of manufacture, and methods have been disclosed that allow dual acting propellers to feather propeller blades when seal failure occurs with less weight added to the aircraft and minimizing dedicated control logic. Disclosed systems, apparatus, articles of manufacture, and methods improve the efficiency of aircraft by reducing weight added to the propeller control system. Additionally, the apparatus and methods disclosed herein allow for pitch fining under seal failure conditions and minimize dedicated control logic by removing seal failure identification algorithm. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to control propeller pitch in dual acting propellers are disclosed herein. Further aspects of the present disclosure are provided by the subject matter of the following clauses.

A propeller control system comprising a piston including a piston rod, a first valve connected to the piston rod via a first piston line and a second piston line, wherein the first valve selectively allows, based on an input signal, hydraulic fluid to transfer to the piston via the first piston line and the second piston line, wherein the first valve is a three-state valve, and an independent valve connected to the piston rod via a third piston line, wherein the independent valve selectively allows, based on an input signal, hydraulic fluid to transfer to the piston via the third piston line and wherein the independent valve operates independently of the first valve.

The propeller control system of any preceding clause, further includes a propeller dome to house the piston wherein a first side of the piston defines a coarse chamber and a second side of the piston defines a fine chamber, and wherein the coarse chamber is larger than the fine chamber, and the fine chamber is separated from the coarse chamber with a seal.

The propeller control system of any preceding clause, wherein the first valve includes a first state, the first state is a first valve line connected to the first piston line of the piston rod via a first port to transfer hydraulic fluid to a first side of the piston, and a second valve line disconnected from the second piston line of the piston rod.

The propeller control system of any preceding clause, wherein the first valve includes a second state, the second state is a second valve line connected to the first piston line of the piston rod via a second port to transfer hydraulic fluid to a first side of the piston, and a third valve line connected to the second piston line of the piston rod via a third port to transfer hydraulic fluid to a second side of the piston.

The propeller control system of any preceding clause, wherein the first valve includes a third state, the third state is a first valve line connected to the first piston line of the piston rod via a first port to transfer hydraulic fluid to a first side of the piston, and the second piston line of the piston connected to a drain line via a third port to transfer hydraulic fluid from a second side of the piston.

The propeller control system of any preceding clause, further including a second valve to selectively allow, based on a signal, hydraulic fluid transfer to the first valve.

The propeller control system of any preceding clause, wherein the independent valve is connected to the third piston line of the piston rod to transfer hydraulic fluid, wherein the hydraulic fluid is transferred with respect to a pitch lock mechanism to prevent a plurality of blades from moving towards fine direction.

The propeller control system of any preceding clause, wherein a controller sends a signal to the first valve to operate in a first state, a second state, or a third state.

A variable pitch propeller assembly comprising a plurality of blades rotatable about an axial direction, a piston including a piston rod, and a propeller control system including a first valve to selectively, based on an input signal, transfer hydraulic fluid to a first piston line and a second piston line of the piston rod via the first piston line and the second piston line, wherein the first valve is a three-state valve, and an independent valve to transfer hydraulic fluid to a third line of the piston rod, wherein the independent valve operates independently of the first valve.

The variable pitch propeller assembly of any preceding clause, wherein the first valve includes a first state, the first state is a first valve line connected to the first piston line of the piston rod via a first port to transfer hydraulic fluid to a first side of the piston, and a second valve line disconnected from the second piston line of the piston rod.

The variable pitch propeller assembly of any preceding clause, wherein the first valve includes a second state, the second state is a second valve line connected to the first piston line of the piston rod via a second port to transfer hydraulic fluid to a first side of the piston, and a third valve line connected to the second piston line of the piston rod via a third port to transfer hydraulic fluid to a second side of the piston.

The variable pitch propeller assembly of any preceding clause, wherein the first valve includes a third state, the third state is a first valve line connected to the first piston line of the piston rod via a first port to transfer hydraulic fluid to a first side of the piston, and the second piston line of the piston connected to a drain line via a third port to transfer hydraulic fluid from a second side of the piston.

The variable pitch propeller assembly of any preceding clause, wherein a second valve is to selectively allow, based on a signal, hydraulic fluid transfer to the first valve.

The variable pitch propeller assembly of any preceding clause, further includes a propeller dome to house the piston wherein a first side of the piston defines a coarse chamber and a second side of the piston defines a fine chamber, wherein the coarse chamber is larger than the fine chamber, and the fine chamber is separated from the coarse chamber with a seal.

The variable pitch propeller assembly of any preceding clause, wherein the independent valve transfers hydraulic fluid with respect to the third line of the piston rod to a pitch lock mechanism to prevent the plurality of blades from moving towards fine direction.

The variable pitch propeller assembly of any preceding clause, a controller sends a signal to the first valve to operate in a first state, a second state, or a third state.

A method to control propeller pitch in dual acting propellers, the method comprising detecting a drift in a pitch angle of a blade towards fine direction, defining a pitch tracking failure condition, supplying, in response to detecting the drift, hydraulic fluid to a first side of a piston defining a coarse chamber, actuating, based on detection of the pitch tracking failure condition, a first valve in a first state, the first state is a first valve line connected to the first piston line of a piston rod via a first port to transfer hydraulic fluid to a first side of the piston, and a second valve line disconnected from a second piston line of the piston rod, and feathering a plurality of blades to a desired position.

The method of any preceding clause, further including activating an independent valve to transfers hydraulic fluid to a third piston line of the piston rod to a pitch lock mechanism to prevent the plurality of blades from moving towards fine direction.

The method of any preceding clause, wherein the first valve includes a second state, the second state is a second valve line connected to the first piston line of the piston rod via a second port to transfer hydraulic fluid to a first side of the piston, and a third valve line connected to the second piston line of the piston rod via a third port to transfer hydraulic fluid to a second side of the piston.

The method of any preceding clause, wherein the first valve includes a third state, the third state is a first valve line connected to the first piston line of the piston rod via a first port to transfer hydraulic fluid to a first side of the piston, and the second piston line of the piston connected to a drain line via a third port to transfer hydraulic fluid from a second side of the piston.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A propeller control system comprising:
- a coarse chamber;
- a fine chamber;
- a piston separating the fine chamber and the coarse chamber, the piston including a piston rod; and
- a first valve connected to the piston rod via a first piston line and a second piston line, wherein the first valve is configured to selectively allow hydraulic fluid to transfer to at least one of (a) the coarse chamber through the piston via the first piston line or (b) the fine chamber through the piston via the second piston line, wherein the first valve is a three-state valve, wherein, when the first valve is in a fine line blockage state, the first valve is configured to block the hydraulic fluid from the fine chamber from transferring to a drain and allow the hydraulic fluid to transfer to the coarse chamber.

2. The propeller control system of claim 1, further includes a propeller dome having an interior to house the piston wherein the piston defines a first side and a second side within the interior and wherein the first side defines the coarse chamber and the second side defines the fine chamber, and wherein the coarse chamber is larger than the fine chamber, and the fine chamber is separated from the coarse chamber with a seal.

3. The propeller control system of claim 1, wherein the first valve has the fine line blockage state, the fine line blockage state includes:
- a first valve line connected to the first piston line of the piston rod via a first port to transfer hydraulic fluid to a first side of the piston; and
- a second valve line disconnected from the second piston line of the piston rod.

4. The propeller control system of claim 1, wherein the first valve has a nominal state, the nominal state includes:
- a second valve line connected to the first piston line of the piston rod via a second port to transfer hydraulic fluid to a first side of the piston; and
- a third valve line connected to the second piston line of the piston rod via a third port to transfer hydraulic fluid to a second side of the piston.

5. The propeller control system of claim 1, wherein the first valve has a feather state, the feather state includes:
- a first valve line connected to the first piston line of the piston rod via a first port to transfer hydraulic fluid to a first side of the piston; and
- the second piston line of the piston connected to the drain via a third port to transfer hydraulic fluid from a second side of the piston.

6. The propeller control system of claim 1, further including a second valve configured to selectively allow hydraulic fluid transfer to the first valve.

7. The propeller control system of claim 1, further including an independent valve connected to the piston rod via a third piston line, wherein the independent valve is configured to selectively allow the hydraulic fluid to transfer to the piston via the third piston line and wherein the independent valve operates independently of the first valve, wherein the independent valve is connected to the third piston line of the piston rod to transfer hydraulic fluid, wherein the hydraulic fluid is transferred with respect to a pitch lock mechanism to prevent a plurality of blades from moving towards fine direction.

8. The propeller control system of claim 1, wherein a controller sends a signal to the first valve to operate in the fine line blockage state, a nominal state, or a feather state.

9. A variable pitch propeller assembly comprising:
- a plurality of blades rotatable about an axial direction;
- a coarse chamber;
- a fine chamber;
- a piston separating the fine chamber and the coarse chamber, the piston including a piston rod; and
- a propeller control system including a first valve to selectively, based on an input signal, transfer hydraulic fluid to the coarse chamber via a first piston line of the piston rod and block the hydraulic fluid from the fine chamber from transferring to a drain via a second piston line of the piston rod, wherein the first valve is a three-state valve.

10. The variable pitch propeller assembly of claim 9, wherein the first valve has a fine line blockage state, the fine line blockage state includes:
- a first valve line connected to the first piston line of the piston rod via a first port to transfer hydraulic fluid to a first side of the piston; and
- a second valve line disconnected from the second piston line of the piston rod.

11. The variable pitch propeller assembly of claim 9, wherein the first valve has a nominal state, the nominal state includes:
- a second valve line connected to the first piston line of the piston rod via a second port to transfer hydraulic fluid to a first side of the piston; and
- a third valve line connected to the second piston line of the piston rod via a third port to transfer hydraulic fluid to a second side of the piston.

12. The variable pitch propeller assembly of claim 9, wherein the first valve has a feather state, the feather state includes:

a first valve line connected to the first piston line of the piston rod via a first port to transfer hydraulic fluid to a first side of the piston; and the second piston line of the piston connected to the drain via a third port to transfer hydraulic fluid from a second side of the piston.

13. The variable pitch propeller assembly of claim 9, further including a second valve to selectively allow, based on a signal, hydraulic fluid transfer to the first valve.

14. The variable pitch propeller assembly of claim 9, further includes a propeller dome to house the piston wherein a first side of the piston defines the coarse chamber and a second side of the piston defines the fine chamber, wherein the coarse chamber is larger than the fine chamber, and the fine chamber is separated from the coarse chamber with a seal.

15. The variable pitch propeller assembly of claim 9, wherein the propeller control system further includes an independent valve to transfer hydraulic fluid to a third line of the piston rod, wherein the independent valve operates independently of the first valve, wherein the independent valve transfers hydraulic fluid with respect to the third line of the piston rod to a pitch lock mechanism to prevent the plurality of blades from moving towards fine direction.

16. The variable pitch propeller assembly of claim 9, wherein a controller sends a signal to the first valve to operate in a fine line blockage state, a nominal state, or a feather state.

* * * * *